United States Patent [19]

Richards

[11] 4,042,188
[45] Aug. 16, 1977

[54] YARN PACKAGE SUPPORT BEARING

[75] Inventor: Michael S. Richards, High Point, N.C.

[73] Assignee: Shawn Products Company, High Point, N.C.

[21] Appl. No.: 692,342

[22] Filed: June 3, 1976

[51] Int. Cl.² .................... B65H 49/00; F16C 13/00; F16C 33/00
[52] U.S. Cl. .......................... 242/129.51; 308/189 R
[58] Field of Search .......... 242/129.5, 129.51, 129.53, 242/68–68.4, 18 R; 308/188, 189 R, 189 A, 190, 193–201; 403/109–111, 1

[56] References Cited

U.S. PATENT DOCUMENTS

| | | | |
|---|---|---|---|
| 2,650,035 | 8/1953 | Egee | 242/18 R |
| 2,651,479 | 9/1953 | Bauer | 242/129.51 |
| 3,131,885 | 5/1964 | Furst et al. | 242/129.51 |
| 3,655,226 | 4/1972 | Cowan | 308/174 X |

Primary Examiner—Leonard D. Christian

[57] ABSTRACT

A yarn package support bearing member for rotatably and releaseably retaining a yarn carrier that is cradled between supporting pivotable arms having a shaft with centering means and a bearing for rotatably and releaseably supporting a flange which cooperatively supports a yarn package with the bearing being securely retained on the shaft for limited angular displacement.

4 Claims, 3 Drawing Figures

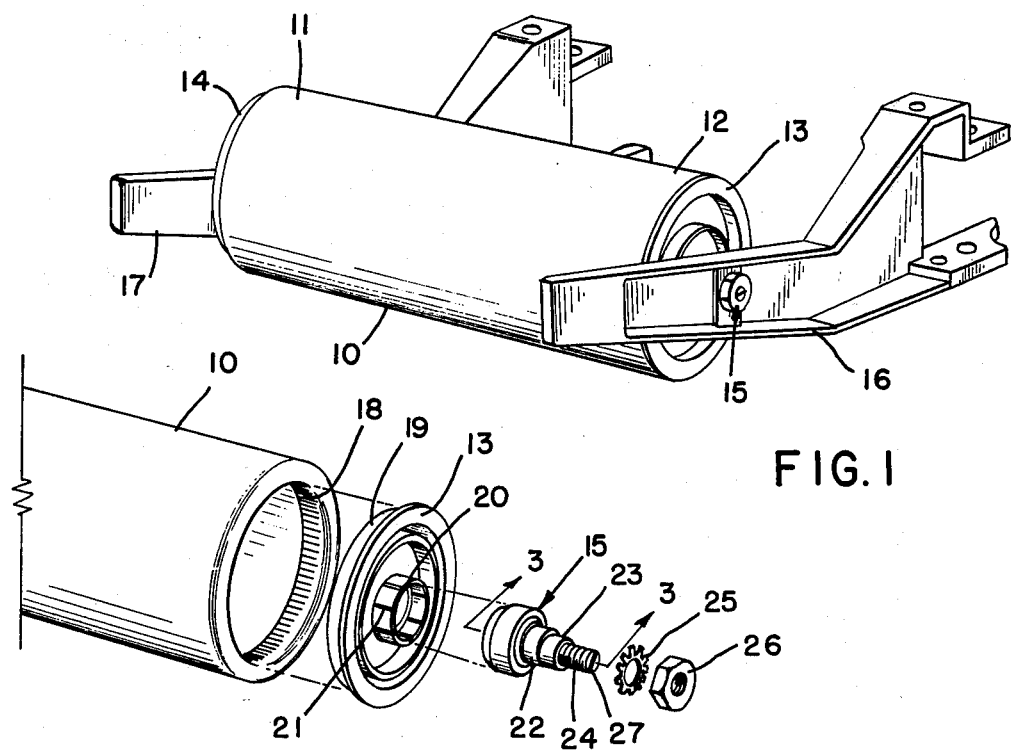
FIG. 1
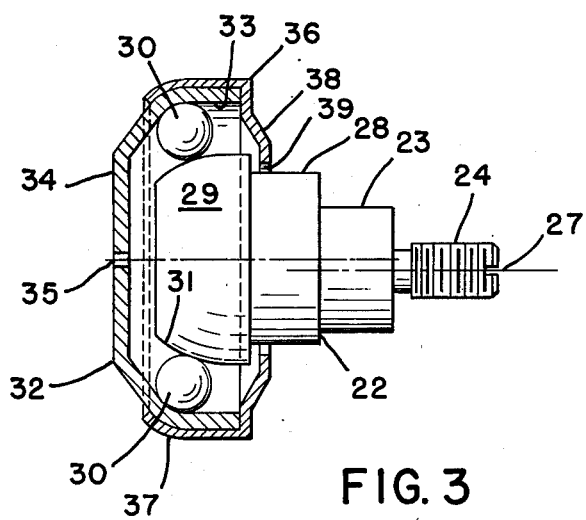
FIG. 2
FIG. 3

YARN PACKAGE SUPPORT BEARING

BACKGROUND, ADVANTAGES AND OBJECTS OF THE INVENTION

It is essential during yarn winding that a uniform package build be formed by the yarn convolutions that are formed on a rotating pirn or cylindrical bobbin as a yarn is fed to the package by a yarn traverse mechanism. Improper yarn winding on a package will cause improper tension in subsequent operations which may not become evident until the yarn is either knitted or woven into a fabric and the fabric dyed.

It is conventional to employ a paper cylindrical tube that is cradled between a pair of projecting arms from the machine frame. Rotatable flanges mounted in a bearing cooperatively and releaseably support the paper or cardboard tube as yarn is being wound thereon. Presently, plastic stub shafts having an eccentrically position retaining stud secures a bearing member in the arm of the supporting cradle with the other end of the shaft being supported in a bearing housing. During bearing alignment to maintain the package in proper orientation, the plastic shaft may be readily withdrawn from the bearing support thereby reducing the effectiveness of the flange retaining head supported in the rotatable bearing member to which the shaft is removably inserted.

It is an object of this invention to provide a yarn package supporting bearing member having a stub shaft with an aligning eccentric portion that is angularly displaceable relative to and not releaseably connected to a bearing head that will cooperatively and releaseably support a yarn package supporting flange.

Another objective of this invention is to provide an all metal yarn package supporting bearing member that is not readily separable and in which the bearing member is tiltable relative to the supporting shaft which is irremoveably connected for rotation and alignment.

A further objective of this invention is to provide a yarn package support bearing member that may be used repeatedly and adjusted readily without separation the individual components.

Yet another objective of this invention is to provide a yarn package support bearing member that will out last presently available plastic members and one in which the individual elements require minimum lubrication over extended periods of use.

Other objectives and advantages of this novel yarn package support bearing member will become more readily apparent from the following detailed description taken in conjunction with the accompanying drawing and the appended claims which are not intended to be limited to the illustrated and described preferred embodiment.

DRAWING DESCRIPTION OF PREFERRED EMBODIMENT

FIG. 1 is a perspective view of a yarn takeup bobbin or pirn cradled in the pivotable arms on which are mounted the yarn package support bearing members of this invention;

FIG. 2 is a partial perspective and exploded view of the various components in spaced relationship for one side of the assembly including the yarn package support bearing assemblies; and FIG. 3 is an enlarged transverse sectional view of the yarn package support bearing assembly taken along section line 3—3 of FIG. 2.

DETAILED DESCRIPTION OF PREFERRED EMBODIMENT OF THE INVENTION

Referring to FIG. 1, there is shown a cylindrical pirn or yarn-receiving bobbin 10 on which yarn is wound from a source of supply (not shown) as on a false twistmachine to form a takeup package. The pirn 10 is usually made of paper, cardboard or plastic and is releaseably mounted at both ends in horizontal alignment through a pair of rotatable pirn-supporting flanges 13 and 14.

Each of the flanges 13 and 14 is rotatably and releaseably secured to a yarn package support bearing member 15 that is securely fastened to the pivotable projecting arm 16 and 17, each of which is mounted on the machine frame (not shown) to cradle the yarn package formed on the tube or pirn 10 being maintained in position through the supporting flanges 13 and 14. The supporting arms 16 and 17 are of conventional construction.

As illustrated in FIG. 2, the paper tube 10 is provided with an inturned section 18 for cooperatively receiving the circular projecting rim 19 on the flange 13. The flange 13 is provided on its opposite side with a bearing hub 20 in which there is a series of spaced slits 21 that are capable of resiliently retaining a bearing member therein and for releaseable engagement.

A yarn package support bearing member 15 shown in FIG. 2 is provided with a stub shaft 22 on which there is machined an eccentric portion 23 for insertion and retention in an opening in the arm 16 or 17. A threaded portion 24 on the shaft cooperatively receives the fluted washer 25 and the retaining threaded nut 26 for retaining the stub shaft on the supporting arm 16 or 17. A slot 27 is provided at the terminal end of the threaded portion 24 to receive a screwdriver for rotating the stub shaft in order to position the eccentric portion 23 in order to maintain proper alignment for the proper winding of the yarn on the tube 10.

The concentric portion 28 of the stub shaft 22 is offset and contiguous with the eccentric portion 23. Integrally connected to the concentric portion 28 is a partial spherical portion 29 that forms an inner race for the ball bearings 30 that are positioned around the convex bearing surface 31 of the bearing inner race. An enlarged head 32 that is dished to form an inwardly extending outer raceway 33 retains the ball bearings 30 in position. If desirable, the exposed end 34 of the head may be provided with a lubricated opening 35 for introducing a lubricant into the bearing housing formed should lubricant be desired periodically.

A cup bearing retaining housing 36 is securely fastened to the enlarged head 34 about the outer portion of the inwardly extending raceway 33 forming a converging skirt 37 to retain the enlarged head in position and form a rotatable bearing member to be cooperatively received in the flange hub 30 to be retained frictionally held therein. The retaining housing 36 has an inwardly extending rim 38 which is provided with an opening 39 through which the concentric portion 28 of the stub shaft protrudes. Sufficient clearance is provided between the concentric portion 28 of the stub shaft and the opening 39 to permit angular displacement of the stub shaft relative to the head 34 and housing 36 to maintain proper alignment of the flange with the yarn-receiving tube thereon.

The threaded portion 24 of the stub shaft may be securely anchored on the pivot arm 16 by the bolt 26 without removing the enlarged bearing inner race 29 from the housing 38.

Preferably, the shaft 22 is machined of steel and case hardened depending upon the particular applications and types of yarn packages to be supported. Frequent alignment of the stub shaft may be required without the previous problems encountered of removing the bearing or stub shaft of plastic from the enlarged rotatable flange supporting head.

I claim:

1. A yarn package support bearing member for rotatably and releaseably retaining a yarn carrier cradled between supporting pivotable arms comprising; a stub shaft fastened to one of said pivotable arms intermediate the arm link, said shaft having an eccentric portion thereon for communicating with said arm, an enlarged head integrally formed on said shaft at one end thereof, said head having at least a partial spherical bearing contour, a cup bearing retaining housing in spaced relation to said enlarged head, a plurality of bearing members retained between said housing and said head, a closure member securely retaining said housing, bearing members and head in bearing relationship, said closure member having a stub shaft opening greater than the shaft diameter for a relatively loose shaft fit for angular displacement, means for retaining the shaft on said arm, and a yarn package supporting flange for releaseable mounting on said housing.

2. A yarn package support bearing member as claimed in claim 1, said shaft having an eccentric portion thereon protruding from said closure member to be retained for alignment in said arm, said shaft being of integral construction.

3. A yarn package support bearing member as claimed in claim 1, said stub shaft being threaded at one end thereof opposite from said head.

4. A yarn package support bearing member as claimed in claim 3, said stub shaft having a transverse slot in the threaded portion whereby the shaft may be rotated for alignment.

* * * * *